United States Patent Office 2,904,585
Patented Sept. 15, 1959

2,904,585
POLYGLYCOL ESTERS

Edward L. Doerr and William E. Weesner, Dayton, Ohio, assignors to Monsanto Chemical Company, St. Louis, Mo., a corporation of Delaware No Drawing. Application February 24, 1958
Serial No. 716,860

6 Claims. (Cl. 260—488)

The present invention is directed to the polyethylene glycol esters of certain branched-chain tridecanoic acids and to a process of preparing such esters by condensation of the said acids with ethylene oxide.

The branched-chain tridecanoic acids forming the acid portion of my novel polyethylene glycol esters are "Koch" acids obtained by acid-catalyzed reaction of propylene tetramer or isobutylene trimer with carbon monoxide and water.

It is an object of the invention to provide wetting agent compounds of high wetting activity and especially useful in connection with textile treating and washing operations. It is a further object to provide compounds and compositions useful as low-sudsing detergents. It is yet another object of the invention to provide compounds useful as starting materials for the preparation of new chemical products.

The polyethylene glycol esters of "Koch" tridecanoic acids have valuable surfactant properties—notably valuable wetting agent properties. In the past natural long chain fatty acids because of their ready availability have been employed to a considerable extent in preparing non-ionic polyethylene glycol surfactants. However, the polyethylene glycol esters of natural fatty acids are deficient in a number of respects; as will appear below, the novel esters of the present invention are far superior in wetting out speeds to polyethylene glycol esters of straight chain acids.

The novel ethylene oxide tridecanoic acid condensates of the present invention can be represented by the formula:

$$R-\overset{O}{\underset{\|}{C}}-O-(C_2H_4O)_nC_2H_4OH$$

in which $n$ is an integer from 4 to 19 or the like, and in which

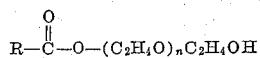

represents the acyl radical of acids produced by reacting propylene tetramer or isobutylene trimer with carbon monoxide in the presence of acid and decomposing the reaction product with water, and comprised predominantly of acids having tertiary carboxyl groups, i.e., tertiary carboxylic acids

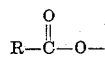

in which the non-carboxyl portion of the molecule represents a dodecyl radical derived from propylene tetramer or isobutylene trimer in which $R_1$, $R_2$, and $R_3$ represent alkyl groups which usually have a branched chain configuration; there may also be some acids present having secondary carboxyl groups, i.e., secondary carboxylic acids,

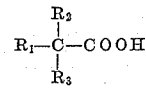

in which the non-carboxylic portion of the acid and $R_1$ and $R_2$ are defined as above. While the acids will undoubtedly have a highly branched structure, it will be realized that the specific structures will depend to a considerable extent upon the olefins from which they are produced. In the Koch process, the addition of carbon monoxide to the olefin double bond ordinarily follows Markownikoff's rule in that the carboxyl radical is attached to the carbon atom carrying the fewest hydrogen atoms—which usually results in tertiary acids. Rearrangement of the branched-chain dodecene, e.g., tetrapropylene, to more highly branched structures may occur along with the carboxylation. The term carboxylation as employed herein is intended to designate the production of carboxyl-containing products in the "Koch" process. It appears that the process involves carbonylation of the olefins followed by hydrolysis, but the specific mechanism of this reaction is not important to an understanding of the present invention.

The highly-branched and largely tertiary tridecanoic acids employed herein will for convenience be referred to as "Koch" tridecanoic acids after Dr. Herbert Koch who has reported extensive work in the preparation and identification of acids, produced by acid catalyzed carboxylation of olefins, Brennstoff Chem., vol. 36, 321–328 (1955). It will be realized, of course, that the term—"Koch" tridecanoic acids—is intended herein to designate tridecanoic acids having the molecular configuration of acids prepared by acid catalyzed carboxylation of propylene tetramer or isobutylene trimer regardless of whether Dr. Koch was the first to prepare such acids, and by no matter whom prepared.

"Koch" acids suitable for preparing the novel ethylene oxide condensates of the present invention can conveniently be identified by their boiling range; the acid-catalyzed carboxylation products boiling in a range of the order of 100 to 150° C. at about 1.3 to 1.5 mm. Hg, and having a composite refractive index of $n_D^{25}$ 1.4430 to 1.4455 are suitable, and the bulk of such acids usually boil at about 120 to 140° C. at about 1.3 to 1.4 mm. Hg, and have a composite refractive index in the neighborhood of $n_D^{25}$ 1.444.

Another great advantage flowing from the discovery of the usefulness of "Koch" acids in preparing valuable polyglycol ester wetting agents is the fact that such acids constitute an inexpensive source material for the preparation of such wetting agents; for the olefins required to produce such acids are readily prepared from petroleum hydrocarbons and are easily carboxylated to acids by the "Koch" process.

In addition to acting as wetting agents, the polyoxyethylene esters of "Koch" tridecanoic acids have valuable detergent properties and provide valuable low-sudsing detergents. In fact the detergent properties in the built detergents of our invention are superior to those of Gardinol, a commercial detergent product obtained by sulfating the alcohols derived by hydrogenation of coconut oil. Moreover, the compounds of the present invention are suitable for use in dentifrices, cosmetic applications, food products, and the like, in which materials containing sulfate groups can not ordinarily be employed. In addition, the non-ionic character of the present compounds permits their employment in many applications where cationic or anionic agents cannot be employed.

The following examples will further illustrate the invention.

EXAMPLE 1

A 2-gram-mole amount of catalyst containing

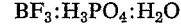

in 1:1:1 proportions was charged to a 3-liter autoclave equipped with stirrer which was then purged with carbon monoxide and pressured to 770 p.s.i. with carbon monoxide. Propylene tetramer was pumped into the autoclave over a 4-hour period at 50 to 60° C. A total of 438 ml. (2 moles) propylene tetramer was added, and additional carbon monoxide was introduced shortly before the close of the period. The pressure at the end of the propylene tetramer addition was 690 p.s.i.; the reaction was permitted to continue for about two more hours. The product was then removed from the bomb and water, 36 ml., was added to the product with stirring. The inorganic layer was separated and the organic layer was washed with water. The organic layer was then extracted with 1 liter of 10% sodium hydroxide in water, and the alkaline extracts were washed with two 200 ml.-portions of petroleum ether. The alkaline solution was then acidified with concentrated hydrochloric acid causing an oil to form, which was extracted with benzene. The benzene solution was washed with water and dried over Drierite. After the benzene was removed by distillation, 286 grams of product was distilled, the bulk of it distilling at 115–146° C./1.5–2.5 mm., $n_D^{25}$ 1.4443. The yield of tridecanoic acid was 66.8% of theory. *Analysis.*—Calcd. for $C_{13}H_{26}O_2$: C, 72.84; H, 12.23; neut. equiv., 214.37. Found: C, 73.06; H, 12.05; neut. equiv., 212.

The propylene tetramer (Enjay) employed in the above procedure was a light yellow liquid having a density at 26° of 0.768.

In another preparation according to the procedure of Example 1, tridecanoic acids were obtained distilling at 101–149° C./1.2–1.5 mm., $n_D^{25}$ 1.4451. In yet another preparation, a large fraction of the tridecanoic acids was obtained at about 120–40° C./1.3–1.4 mm., $n_D^{25}$ 1.4430.

Triisobutylene can be substituted for tetrapropylene and carboxylated according to the procedure of Example 1 to prepare "Koch" acids suitable for oxyethylation to obtain valuable wetting agents in accordance with the present invention, although the amounts of low molecular acids produced along with the tridecanoic acids may necessitate more extensive fractionation prior to oxyethylation than is the case with the tetrapropylene carboxylation products.

In preparing "Koch" tridecanoic acids from tetrapropylene or triisobutylene suitable for use in the present invention, any of the acid-catalyzed carboxylation procedures can be employed. In addition to Koch's Brennstoff Chemie publication, supra, any of the procedures taught in Koch's German patent application St. 4619 ivb/12 o, published November 24, 1955; or Koch and Huisken's German patent application, St. 8190 ivb/12 o, published February 8, 1956, can be employed. While the carboxylation can be conducted at temperatures of say 100 to 350° C. and carbon monoxide pressures of 500–1000 atmospheres and the like, it has been discovered in the "Koch" process that adding the stoichiometrically required water subsequent to the reaction of olefin and carbon monoxide in the presence of strong inorganic acid, makes it feasible to employ pressures of 50 to 100 atmospheres, and often 20 to 30 atmospheres, or even atmospheric pressure, at temperatures of the order of 0° C. to 50° C. or so, and certainly at temperatures no greater than 100° C.

Any strong and concentrated acids can be employed as catalysts—particularly strong and concentrated inorganic acids or materials which hydrolyze to inorganic acids—in preparing the "Koch" tridecanoic acids. Such mineral acids as hydrogen fluoride, sulfuric acid, phosphoric acid, and acid-boron fluoride complexes are particularly suitable catalysts. It is preferred that the catalyst be as highly concentrated as possible or even anhydrous. It is preferred that sulfuric acid, for example, be of at least 90% concentration. Monohydroxyfluoroboric acid admixed with other acids, for example, sulfuric or phosphoric acids, comprises a very good catalyst. Such catalyst can readily be prepared by simply saturating an aqueous mineral acid, e.g., phosphoric acid, with $BF_3$, thereby converting the water in the acid to monohydroxyfluoroboric acid. The catalysts are preferably employed in amounts of, say, from about 0.5 to 3.0 moles or more per mole of olefin, although the preferred range with sulfuric acid is usually about 1.5 to 3.0 moles per mole of olefin.

EXAMPLE 2

"Koch" tridecanoic acids, 213.2 grams, prepared according to the procedure of Example 1 and having a neutralization equivalent of 213.2 were charged to a 1-liter reactor fitted with a stirrer, thermometer, and gas disperser, and 4.2 grams KOH was added. The mixture was heated to 140° C. under nitrogen, and ethylene oxide was passed into the mixture. The temperature was maintained at 150–160° C. for a two-hour "induction period," and the ethylene oxide then reacted vigorously and exothermically for one-half hour while the temperature was controlled at 155–165° by water bath cooling. The ethylene oxide had condensed in a ratio of 5 moles with 1 mole of the tridecanoic acids, as shown by the 1050 grams of reaction mixture. A 194 gram sample of the tridecanoic acid-ethylene oxide condensate was withdrawn from the reactor and tested for surfactant properties, notably for wetting agent properties. The test results are given below.

EXAMPLE 3

The reaction of Example 2 was continued by adding ethylene oxide to the reaction mixture remaining in the reactor until after 45 minutes at 160–175° C., a 10:1 mole ratio of ethylene oxide to tridecanoic acids was obtained, and the reaction product weighed 979 grams. A sample of the product was withdrawn for testing.

EXAMPLE 4

The reaction of Example 3 was continued by addition of ethylene oxide for 20 minutes at 175–185° C. to obtain a condensate of ethylene oxide and tridecanoic acids in about 15:1 mole ratio.

EXAMPLE 5

Equimolar portions of the product samples of Examples 2 and 3 were combined to obtain an ethylene oxide-tridecanoic acid condensate having an average mole ratio of 7.5:1.

The wetting properties of our ethylene oxide condensates were determined by the Draves-Clarkson test (American Dyestuff Reporter, vol. 28, pages 420–428, Aug. 7, 1939). This test measures the time necessary for a weighted, standardized skein of cotton yarn to sink in a stated concentration of the wetting agent in aqueous solution. The results, in comparison with other ethylene oxide condensates, are shown below.

*Table I*

|  | Wetting Speed, Seconds at Percent Concentration | |
| --- | --- | --- |
| Concentration | 0.5 | 0.25 |
| Product of Ex. 2 | 4.1 | 5 |
| Product of Ex. 5 | 4.0 | 6.8 |
| Product of Ex. 3 | 4.3 | 8.2 |
| Product of Ex. 4 | 4.9 | 10.4 |
| $C_{11}$–$C_{15}$ fatty acids +7.5 EO [3] | 21.4 | 45.5 |
| $C_{11}$–$C_{15}$ fatty acids +10 EO | 32.6 | 55.2 |
| $C_{11}$–$C_{15}$ fatty acids +15 EO | 57.3 | 83.1 |
| oleic acid +10 EO | 51.0 | 74.9 |
| oleic acid +15 EO | 61.8 | 73.4 |
| coconut acids [2] +5 EO | 22 |  |
| coconut acids +10 EO | 26 |  |
| coconut acids +15 EO | 39 |  |

[1] Principally normal $C_{11}$–$C_{15}$ fatty acids obtained by air oxidation of petroleum fraction paraffins.
[2] Composed to a large extent of lauric acid.
[3] EO (moles ethylene oxide).

The above data clearly demonstrates the superior wetting agent properties of the tridecanoate-ethylene oxide condensates of the present invention as compared to ethylene-oxide condensates of high molecular weight fatty acids containing primary carboxyl groups.

The superior wetting- and other surface-active properties of the present condensation products are utilized advantageously in any process involving the treatment of textile materials with aqueous solutions where it is desired to obtain rapid and efficient penetration thereof. For this purpose the aqueous solutions should contain from 0.5 to 0.02% by weight of condensation product.

The "Koch" tridecanoic acid-ethylene oxide condensates of the present invention also are valuable as controlled, low-sudsing detergents, particularly in built compositions for general detergent purposes. A suitable built composition may contain the following ingredients in parts by weight:

| | Parts |
|---|---|
| Ethylene oxide-tridecanoic acid condensate | 15.0 |
| Sodium polyphosphates | 40.0 |
| Soda ash | 20.0 |
| Aqueous sodium silicate | 24.0 |
| Sodium carboxy methyl cellulose | 1.0 |
| | 100.0 |

For general washing purposes the detergent is employed in concentrations varying from 0.05% to 0.2% by weight of the washing solution.

The detergency of such built compositions containing the ethylene oxide condensates of the present invention was determined by means of the standard detergency tests described by Jay C. Harris in Soap and Sanitary Chemicals for August and September 1943. The detergency is reported below as compared to that of Gardinol, which is a commercial detergent product produced by sulfating the alcohols derived by hydrogenation of coconut oil.

*Table II*

| | Detergency, Percent of Gardinol Built (15% Active) | |
|---|---|---|
| Water Hardness | 50 p.p.m. | 300 p.p.m. |
| Product of Ex. 2 | 104 | 104 |
| Product of Ex. 5 | 110 | 114 |
| Product of Ex. 3 | 113 | 120 |
| Product of Ex. 4 | 113 | 116 |

The low sudsing and foaming properties of my products were indicated by the Ross-Miles procedure (A.S.T.M.) both in soft (50 p.p.m.) water and in hard (300 p.p.m.) water. The results are reported below.

*Table III*

| Detergent (0.1% Concentration) | Centimeters of Lather | | | |
|---|---|---|---|---|
| | 50 p.p.m. | | 300 p.p.m. | |
| | At once | 5 min. | At Once | 5 min. |
| Product of Ex. 2 | 1.1 | trace | 0.9 | trace |
| Product of Ex. 5 | 3.9 | 1.7 | 1.9 | 0.9 |
| Product of Ex. 3 | 4.4 | 2.0 | 1.9 | trace |
| Product of Ex. 4 | 4.1 | 1.3 | 2.0 | 0.9 |

The data of Tables II and III clearly demonstrate that the products of our invention are useful, low-sudsing detergents.

When the herein-disclosed condensation products are employed as detergents, it is preferred that they be utilized as built compositions, but they can also be utilized in 100% active form. They can advantageously be employed in such built compositions as the following:

| | Parts |
|---|---|
| Condensation product of ethylene oxide with tridecanoic acid | 10–25 |
| Tetrasodium pyrophosphate, sodium tripolyphosphate, or mixtures thereof (anhydrous basis) | 20–60 |
| Sodium silicate, $Na_2O:SiO_2$ ratio of 1:2 to 1:3.2 (anhydrous basis) | 6–25 |
| Starch | 0–20 |
| Alkaline material—sodium carbonate, sodium bicarbonate and mixtures thereof (anhydrous basis) | 10–25 |

To the above product may be added from 0.1 to 5 parts of carboxy methyl cellulose. All parts are by weight.

For washing soiled textiles, the above compositions are dissolved in hot water to give preferably a 0.1% to 0.25% by weight solution, although other concentrations may also be employed.

My described novel compounds are ordinarily prepared by passing ethylene oxide into the described "Koch" acids at temperatures of from about 110° C. to about 170° C. or so until at least 5 but not more than 20 moles of ethylene oxide have combined with each mole of "Koch" acids; catalysts, particularly alkaline catalysts such as potassium hydroxide, may be employed. However, it will be understood that the described compounds are within the invention whether prepared by the herein described process, or by other methods, as, for example, by esterification of the described "Koch" acids with polyethylene glycols.

As taught herein, the polyethylene glycol esters of "Koch" tridecanoic acids have valuable wetting activity and detersive properties. In addition, it will be possible to employ the said esters as intermediate compounds in the preparation of other chemical compounds. For example, sulfation of the hydroxyl group of the said esters, i.e., replacement of the free —OH group with an —O—$SO_3H$ group, and preparation of the salts thereof, particularly alkali metal salts, would produce sulfuric tridecanoate polyethylene glycol ester salts having valuable surfactant activities, due to the presence of the branched-chain "Koch" tridecanoate group along with the other groups in such salts.

We claim:

1. The polyethylene glycol esters of tridecanoic acids having the molecular configuration of acids produced by the acid-catalyzed carboxylation with carbon monoxide and water of an olefin material selected from the class consisting of triisobutylene and tetrapropylene, said esters having at least 5 and not more than 20 oxyethylene units per molecule.

2. The esters of claim 1 wherein the tridecanoic acids boil in the range of 100 to 150° C. at 1.3 to 1.4 mm. Hg.

3. The polyethylene glycol esters of tridecanoic acids having the molecular configuration of acids produced by treating tetrapropylene with carbon monoxide in the presence of strong inorganic acid, and decomposing the resulting reaction product with water, said esters having at least 5 but not more than 20 oxyethylene groups per molecule.

4. The polyethylene glycol esters of acids produced by treating tetrapropylene with carbon monoxide in the presence of strong inorganic acid, and decomposing the resulting reaction product with water to obtain highly-branched, mostly tertiary aliphatic carboxylic acids having a boiling range of about 120 to 140° C. at 1.3 to 1.4 mm. Hg., the said esters of said acids having from 5 to 20 oxyethylene groups per molecule.

5. The process of preparing ethylene oxide condensates of acids having the molecular configuration of acids produced by acid-catalyzed carboxylation with carbon monoxide and water of an olefin material selected from the group consisting of tetrapropylene and triisobutylene which comprises passing ethylene oxide into said acids at a temperature of 110° to 170° C. until from 5 to 20 moles of ethylene oxide have combined with each mole of said acids.

6. The polyethylene glycol esters of acids produced by treating tetrapropylene with carbon monoxide in highly concentrated strong inorganic acid at pressures of 50 to 1000 atmospheres at temperatures of about 50° C. to about 100° C. and decomposing the resulting reaction product with water to obtain highly-branched, mostly tertiary aliphatic carboxylic acids having a boiling range of about 120 to 140° C. at 1.3 to 1.4 mm. Hg., the said esters of said acids having from 5 to 20 oxyethylene groups per molecule.

No references cited.